United States Patent
Lietz et al.

(10) Patent No.: US 7,660,935 B2
(45) Date of Patent: Feb. 9, 2010

(54) NETWORK BRIDGE

(75) Inventors: Stephan Lietz, Bad Salzdetfurth (DE); Thomas Eymann, Hildesheim (DE); Christoph Kunze, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 252 days.

(21) Appl. No.: 10/580,510

(22) PCT Filed: Nov. 19, 2004

(86) PCT No.: PCT/EP2004/053011

§ 371 (c)(1),
(2), (4) Date: Feb. 20, 2007

(87) PCT Pub. No.: WO2005/055536

PCT Pub. Date: Jun. 16, 2005

(65) Prior Publication Data

US 2007/0274326 A1  Nov. 29, 2007

(30) Foreign Application Priority Data

Dec. 2, 2003  (DE) .............................. 103 56 128

(51) Int. Cl.
*G06F 13/36* (2006.01)
*G06F 13/38* (2006.01)
(52) U.S. Cl. ..................................................... 710/311
(58) Field of Classification Search ................. 710/310, 710/311
See application file for complete search history.

(56) References Cited

U.S. PATENT DOCUMENTS

| 6,389,496 B1 * | 5/2002 | Matsuda ...................... 710/316 |
| 6,445,711 B1 * | 9/2002 | Scheel et al. ................. 370/402 |
| 6,519,671 B1 * | 2/2003 | Kondou et al. .............. 710/311 |
| 7,007,078 B2 * | 2/2006 | Matsuda ...................... 709/220 |
| 7,043,594 B2 * | 5/2006 | Fukushima et al. .......... 710/314 |
| 2002/0167953 A1 * | 11/2002 | Scheel et al. ................. 370/401 |
| 2003/0053466 A1 * | 3/2003 | Bizet et al. .................... 370/401 |
| 2003/0188081 A1 * | 10/2003 | Fukushima et al. ......... 710/314 |

FOREIGN PATENT DOCUMENTS

| EP | 0 933 900 | 4/1999 |
| EP | 1 134 937 | 9/2001 |
| EP | 1 303 079 | 4/2003 |
| EP | 1 331 775 | 7/2003 |

OTHER PUBLICATIONS

Texas Instruments; "TSB12C01A Data Manual"; Texas Instruments; Document No. SLLS219B; Nov. 1998; pp. 1-59.*
IEEE-SA: "Draft Standard for High Performance Serial Bus Bridges"; Nov. 21, 2003.

* cited by examiner

*Primary Examiner*—Ryan M Stiglic
(74) *Attorney, Agent, or Firm*—Kenyon & Kenyon LLP

(57) ABSTRACT

A network bridge with a configuration and control unit. The unit is connected to some or all of the functional components of the network bridge via interfaces. The unit may poll and evaluate data within the functional components, including operating data and/or parameters. The unit may manipulate the data and/or parameters within the functional components, based on the evaluation of that data.

9 Claims, 3 Drawing Sheets

NETWORK BRIDGE

FIELD OF THE INVENTION

The present invention relates to a network bridge, in particular for coupling serial IEEE 1394 buses.

BACKGROUND INFORMATION

Networks conforming to IEEE 1394 are made up, as shown in FIG. 1, of a number of nodes K1 . . . through Kn in the network, the theoretical maximum number of which is limited to 63 by the length of the corresponding node identifier (ID). The node ID for addressing the individual nodes has a length of 6 bits; the address 0xFF is reserved as a broadcast address. If it is desired to connect more than 63 nodes, the possibility exists of connecting multiple separate buses B1, B2 via a network bridge (bus bridge) NB. These buses can in turn be individually addressed via a bus ID. The bus ID has a length of 10 bits, corresponding to 1,024 buses. Theoretically, therefore, 1,024*63=64,512 nodes can be connected into one network system.

A serial bus conforming to IEEE 1394 supports the transfer of asynchronous and isochronous data. Whereas the reception of asynchronous data packets must be acknowledged by the receiving node in order to ensure reliable data transfer, no acknowledgment is necessary for isochronous data. Network bridges for coupling multiple buses must support the transfer of both data types. At the same time, they must ensure that in more-complex topologies each data packet can reach its receiver, and that all the buses connected into the network system run on a synchronized cycle. Draft Standard IEEE 1394.1 specifies the functionality of such a High Performance Serial Bus Bridge, specifically for use in networks conforming to IEEE 1394 b.

SUMMARY OF THE INVENTION

The network bridge according to the present invention, having means for configuration and control of the network bridge, access being provided, via interfaces, to some or all functional blocks of the network bridge for the polling and evaluation of useful data, operating data, and/or parameters, and for manipulation of those data and/or parameters, and thus of the functional blocks, on the basis of the evaluation, makes possible static or dynamic management of the functional blocks within the network bridge. The network bridge is thereby capable of adjusting itself to varying boundary conditions in the network, and minimizing the resources required for the functionality of the network bridge.

Insertion of an additional software layer into the network bridge architecture is particularly advantageous. This bridge management and configuration layer can access some or all other functional blocks via suitable software interfaces, and can both read out information from those blocks and modify parameters for their functioning.

It is thereby possible, for example, inside or above that software layer, to calculate statistics about various functional parameters of the functional blocks. By way of further software layers located above the management and configuration layer, the network operator or user can moreover directly or indirectly control the function of the network bridge.

In networks with varying operating parameters, for example varying data throughputs or varying packet sizes, it is thereby possible to optimally configure and utilize the limited resources available, for example memory and/or line capacity. The outlay for constructing such a network bridge can thereby be reduced to a minimum, and the performance of the network bridge at the same time can be increased.

European Patent Application No. EP 0 933 900 describes a network bridge for an IEEE 1394 bus. The "bridge manager" provided therein is not, however, embodied to handle configuration and management of the functional blocks that are described in IEEE 1394.1. What is described therein is a management level not for configuration of the individual functional blocks, but at most for external functionality. The implementation according to the present invention involves an optimization of internal functionality, ensuring that a network bridge conforming to IEEE 1394.1 can be constructed with the simplest possible hardware.

DETAILED DESCRIPTION

For better comprehension, the manner of operation of an architecture model for a network bridge according to IEEE 1394 Draft Version 1.04 will first be presented, before the actual invention is described.

Figure 1:
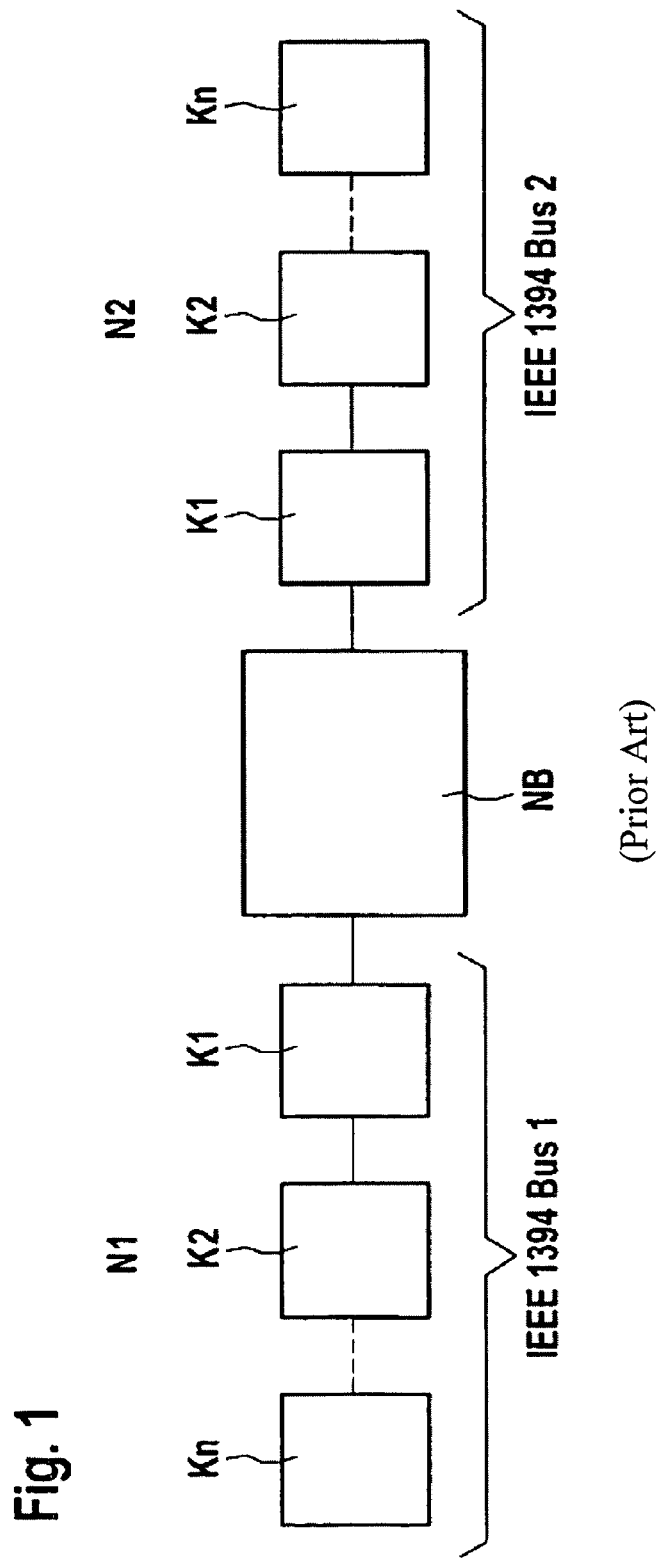
FIG. 1 shows networks conforming to IEEE 1394.
Figure 2:
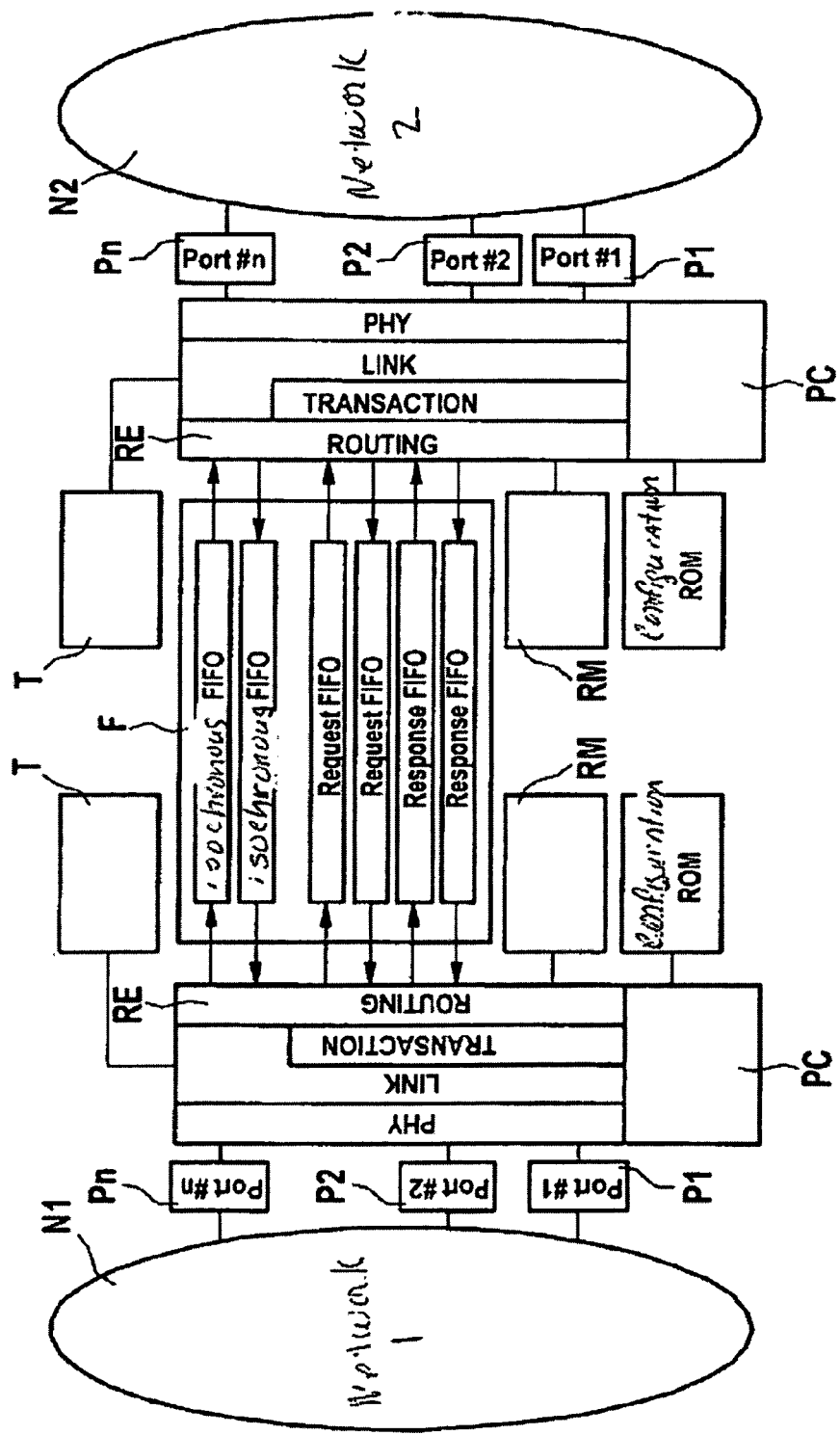
FIG. 2 shows an architecture model for a network bridge.

The network bridge shown in FIG. 2 is connected via its respective ports P1, P2, . . . Pn to two independent networks N1, N2, and can receive and transmit data. In general, it will receive data from one network and transmit it into the other network.

The "Port," "Configuration ROM," "PHY," "Link," and "Transaction" functional blocks correspond to those of a standard network node conforming to IEEE 1394. The bridge additionally possesses routing maps RM and a routing unit RE for each of the two networks. Information about the topology and node addresses in the respective networks is kept in routing maps RM; and via routing unit RE, data can be exchanged between the Link or Transaction layer and the temporary memories of the network bridge (FIFO block F). According to IEEE 1394.1, FIFO block F is made up of a number of individual FIFOs which temporarily store data that are to be transported from one bus to the other. The network bridge additionally possesses internal timers T ("cycle timers") which allow it to synchronize the cycles in the two buses. Routing units RE, as well as the "Port," "Configuration ROM," "PHY," "Link," and "Transaction" functional blocks, are controlled via the portal control (PC) functional units.

Figure 3:
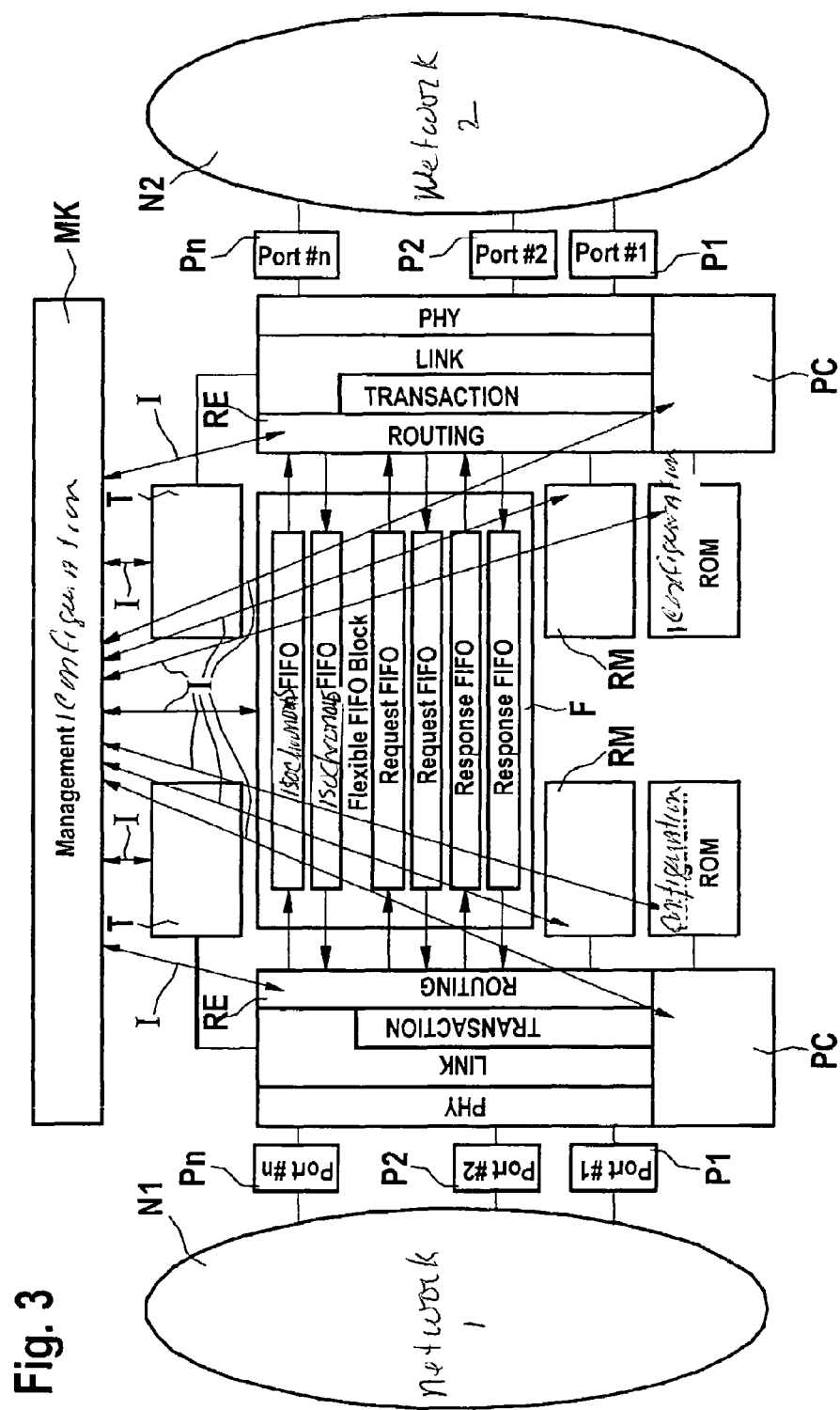
FIG. 3 shows the architecture model according to FIG. 2 having means for configuring and controlling the network bridge, and interfaces to the functional blocks of the network bridge.

According to the present invention, each functional block in FIG. 3 possesses an additional interface I through which data can be read and/or written. By way of these interfaces I, management and configuration layer MK according to the present invention—which can be embodied in hardware or, as presented above, in software—can manipulate statistical data, useful data, or parameters for the operation of the functional blocks. The collection of a variety of data makes it possible for the software layer according to the present invention to quickly prepare statistics about the current operation of the network bridge. Those data can in turn be used to optimize the operation of the functional blocks, for example by modifying parameters within the functional blocks. One example is an IEEE 1394 network in which at times predominantly isochronous data, e.g. audio and video streams, and at other times asynchronous data, are transferred. By way of statistical evaluations, management and configuration layer MK (or software layers located above it) can recognize that the proportion of asynchronous data in the total data volume is sharply increasing. It is then possible to reconfigure the flexible FIFO block, or stipulate appropriate parameters to it for automatic reconfiguration, in such a way that the memory regions for isochronous data are made smaller, and those for asynchronous data are enlarged. As a result, the network bridge can react quickly to changes, and need not constantly keep available memory regions for large isochronous and asynchronous data sets.

A further example is a network in which unauthorized accesses to blocked memory regions are taking place, because of a defective node or an attack. In this case the network bridge not only can recognize the attacks, but can also suppress them and thus ensure smooth operation of the rest of the network. To achieve this, it can stop transfer of the relevant data packets and, if applicable, can disconnect the defective device from the network by a direct intervention in its PHY configuration register. The other functional blocks of the network bridge can be controlled in similar fashion.

What is claimed is:

1. A network bridge comprising:
   at least one arrangement for configuration and control of the network bridge;
   at least one interface for providing access to at least some functional blocks of the network bridge for polling and evaluation of at least one of statistical data, performance data, operating data, and parameters, and for manipulation of the at least one of statistical data, performance data, operating data, and parameters, and of the functional blocks, as a function of the evaluation, including detecting a defect in or an attack from a device connected to the network bridge; and
   situated above the software layer for configuration and control, at least one further software layer via which one of a network operator and a user can control functions of the network bridge;
   wherein the at least one arrangement includes a software layer within a network bridge architecture.

2. The network bridge according to claim 1, wherein the network bridge is for coupling serial IEEE 1394 buses.

3. The network bridge according to claim 1, wherein a configuration of resources, including at least one of memory capacity and line capacity, is a function of varying operating parameters.

4. The network bridge according to claim 3, wherein an allocation of memory regions, including a temporary memory for data to be transported via the network bridge, is a function of a statistical evaluation of a data volume for different data types including at least one of asynchronous and isochronous data.

5. The network bridge according to claim 4, wherein, in the event of at least one of (a) a defect in one of a connected bus and network and (b) an attack by an unauthorized person, at least one of (c) a transfer of data is haltable and (d) one of a relevant bus and a connected device is deactivatable.

6. The network bridge according to claim 1, wherein responsive to the detecting, the defect or attack is suppressed by removing a source device responsible for the defect or attack via an interface between the arrangement and a PHY configuration register.

7. The network bridge according to claim 1, wherein responsive to the detecting, the defect or attack is suppressed by stopping transmission of data packets between the network bridge and a source device responsible for the defect or attack.

8. The network bridge according to claim 1, wherein there is a detected attack and the detected attack includes an unauthorized access to blocked memory regions.

9. The network bridge according to claim 3, wherein an allocation of memory regions, including a temporary memory for data to be transported via the network bridge, is a function of a statistical evaluation of a data volume for different data types including at least asynchronous data.

* * * * *

UNITED STATES PATENT AND TRADEMARK OFFICE
CERTIFICATE OF CORRECTION

PATENT NO. : 7,660,935 B2
APPLICATION NO. : 10/580510
DATED : February 9, 2010
INVENTOR(S) : Lietz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 458 days.

Signed and Sealed this

Thirtieth Day of November, 2010

David J. Kappos
*Director of the United States Patent and Trademark Office*